(12) United States Patent
Ramos

(10) Patent No.: US 10,791,864 B2
(45) Date of Patent: Oct. 6, 2020

(54) CACTUS CLEANING TOOL

(76) Inventor: Henry Ramos, Tulare, CA (US)

( * ) Notice: Subject to any disclaimer, the term of this patent is extended or adjusted under 35 U.S.C. 154(b) by 0 days.

(21) Appl. No.: 12/384,645

(22) Filed: Apr. 6, 2009

(65) Prior Publication Data

US 2009/0199414 A1 Aug. 13, 2009

Related U.S. Application Data

(63) Continuation-in-part of application No. 11/649,114, filed on Sep. 11, 2007, now abandoned.

(51) Int. Cl.
*A47J 17/02* (2006.01)

(52) U.S. Cl.
CPC ..................... *A47J 17/02* (2013.01)

(58) Field of Classification Search
CPC .. A47J 17/02; A47J 17/04; A47J 17/06; A47J 17/08; A47J 17/10; A47J 17/14; A47J 17/16
USPC ... 30/314–318, 278, 279.2, 279.4, 280, 281, 30/113.1, 113.2, 321, 123, 123.5, 121.5, 30/123.6, 123.7; 99/488
See application file for complete search history.

(56) References Cited

U.S. PATENT DOCUMENTS

| | | | | |
|---|---|---|---|---|
| 645,447 A * | 3/1900 | Allen | ...................... | A47J 17/02 30/279.6 |
| 759,005 A * | 5/1904 | McLeod | .................. | A47J 17/02 30/279.6 |
| 983,603 A * | 2/1911 | Carter | ...................... | A47J 17/02 30/285 |
| 1,071,603 A * | 8/1913 | Castello | .................. | B26B 27/00 30/280 |
| 1,371,948 A * | 3/1921 | Szutz | .............................. | 30/316 |
| 1,530,822 A * | 3/1925 | Gibson | ........................ | 30/279.2 |
| 1,667,596 A * | 4/1928 | Kapota | .................... | A47J 17/02 30/279.6 |
| 1,674,271 A * | 6/1928 | Winquist | ................ | A47J 25/00 30/279.6 |
| 1,724,980 A * | 8/1929 | Terrell | ..................... | A47J 17/02 30/279.6 |
| 1,759,539 A * | 5/1930 | Carlson | ........................ | 30/279.6 |
| 1,991,267 A * | 2/1935 | Waldron | ................. | A47J 17/06 30/280 |
| 2,007,647 A * | 7/1935 | Herly | ...................... | A47J 17/02 30/279.6 |
| 2,010,208 A * | 8/1935 | Wickbergh | ............. | A47J 17/02 30/279.6 |

(Continued)

*Primary Examiner* — Ghassem Alie
*Assistant Examiner* — Bharat C Patel
(74) *Attorney, Agent, or Firm* — Richard A. Ryan

(57) ABSTRACT

A cactus cleaning tool comprising a handle and a cleaning section at one end of the handle for safely, quickly and easily cleaning a section of cactus. The cleaning section has a body member with a proximal end at the handle and a distal end outwardly disposed from the handle. The handle is angled upward relative to the body member. The tool has a scooping tip with an edge configured to allow the user to scoop out thorns. The tool has a slicing section with a slot defining a pair of longitudinally disposed sharpened cutting edges for removing the cactus skin. The top of the body member is open. The tool has a outwardly disposed tapper near its distal end to allow the user to tap the tool against a hard surface and dislodge cactus debris stuck on the tool. The tool is particularly useful for cleaning mission cactus.

16 Claims, 3 Drawing Sheets

(56) References Cited

U.S. PATENT DOCUMENTS

| | | | | |
|---|---|---|---|---|
| 2,079,496 | A | * | 5/1937 | Domack ................ A47J 17/02 30/113.3 |
| 2,228,572 | A | * | 1/1941 | Lofgren ................ A47J 17/02 30/279.6 |
| 2,252,094 | A | * | 8/1941 | Palmer ................ A47J 17/02 30/279.6 |
| 2,263,531 | A | * | 11/1941 | Kevorkian ...................... 30/301 |
| 2,570,002 | A | * | 10/1951 | McMillen ............... A47J 17/02 30/279.6 |
| 2,686,690 | A | * | 8/1954 | Andrews ...................... 294/50.7 |
| 4,383,367 | A | * | 5/1983 | Mielnicki ................ B26B 3/04 30/114 |
| 4,972,585 | A | * | 11/1990 | Sasaki ............................ 30/240 |
| 5,062,210 | A | | 11/1991 | Arroyo, Jr. |
| 5,196,036 | A | | 3/1993 | Lamas |
| 5,920,991 | A | * | 7/1999 | Tracy ........................ B26B 3/00 30/278 |
| 6,401,341 | B1 | * | 6/2002 | Hernandez ...................... 30/136 |
| 7,140,111 | B2 | * | 11/2006 | Di Bitonto et al. ......... 30/279.6 |
| 7,631,429 | B2 | * | 12/2009 | Chapman et al. .......... 30/279.6 |

\* cited by examiner

CACTUS CLEANING TOOL

CROSS-REFERENCE TO RELATED APPLICATIONS

This patent application is a continuation-in-part of U.S. patent application Ser. No. 11/649,114 filed Sep. 11, 2007, now abandoned.

STATEMENT REGARDING FEDERALLY SPONSORED RESEARCH

Not Applicable.

BACKGROUND OF THE INVENTION

A. Field of the Invention

The field of the present invention relates generally to cleaning tools which are useful for preparing cactus and other plants having stickers, thorns or other potentially painful components for cooking and/or eating. In particular, the present invention relates to such tools that are specially configured to assist the user in removing the stickers, thorns and the like from the surface of the cactus without injury and in separating the skin and other non-edible portions of the cactus from the edible portions thereof.

B. Background

Many people prefer utilizing fresh, natural plants as a source of food, as an ingredient in food items and as a source of vitamins and/or medicine. One issue with regard to the utilization of fresh plants that often limits a person's use of such plants is the need to prepare the plant for use. Many fresh plants require one or more non-edible components of the plant to be removed from the edible portion of the plant in order to further prepare the plant for its intended use. An example of such plants are cacti. As most persons are aware, most species of cactus have a generally non-edible skin and numerous thorns, stickers, spines or the like, hereinafter collectively referred to as thorns, projecting from the surface of the cactus. In addition to being non-edible, the thorns of most cactus have sharp points that are painful if they come into contact with the person preparing the cactus for eating or other use. Unfortunately, if a person desires to utilize a cactus as a source of food, he or she must deal with the thorns. The skin of most cacti are somewhat fibrous and are generally not good to eat and do not contain the health and/or medicinal benefits of the portion of the cactus that is desired. As such, the skin of most cacti is removed and discarded.

A common food made from cactus is known as nopal, which is a vegetable-type food made from the young pad or leaf segments of the prickly pear (mission) cactus, which is of the *Opuntia Mill.* genus. Although a variety of different species of the prickly pear cactus can be utilized, the most common source of nopal is from the species *Opuntia ficus-indica* or *Opuntia megacantha*. The use of the prickly pear pad to produce nopales is generally well known in Mexico and the southwestern United States, where prickly pear is quite common, and nopales are utilized in a variety of Mexican food dishes, often in combination with other vegetables as a salad or with eggs or meat. Nopales are very rich in fiber and vitamins, particularly vitamin A, vitamin C and vitamin K, and minerals, such as magnesium, potassium and manganese. These vegetables are also a good source of riboflavin, vitamin B6, iron and copper. Typically, but not exclusively, nopales are boiled in water, drained and then diced in to small sections which are mixed with other ingredients.

The pad of the prickly pear cactus is a somewhat large, leaf-like paddle-shaped member which is covered with a plurality of thorns that generally grow in clusters or clumps along the surface or edges of the pad. To utilize these pads as food or the like, the thorns and the skin are removed from the edible, fleshy portion of the pad. Most persons utilize a standard kitchen knife, having a straight blade extending longitudinally from the distal end of a handle, to remove the thorns and skin from the pad. Typically, the blade is moved along the surface of the pad in a slicing motion to cut away the thorns that extend outwardly from the pad. Unfortunately, this procedure can result in much of the fleshy edible portion of the plant being wasted and the thorns coming into contact with the person's hand that is manipulating the knife. Because of these problems, many people utilize the tip of the knife to remove the thorns, a procedure which is well known to be less effective.

Various cactus cleaning tools exist for assisting with the preparation of prickly pear cactus into nopal. For instance, U.S. Pat. No. 5,062,210 to Arroyo, Jr. describes a cactus thorn removing tool having an inverted V-shaped handle with tabs at the open end thereof that are configured to securely engage a conventional wafer-type razor blade. The thorns are removed from the cactus by placing one of the cutting edges of the razor blade on the surface of the cactus adjacent to the base of the thorn and then rotating the handle to apply a circular motion to the blade. The circular motion and concavo-convex shaped cutting edge of the razor blade, which results from the handle bending the razor blade, cuts into the cactus beneath the thorn to remove the thorn from the pad, leaving only a small semi-circular depression or dimple at the site of the thorn. Another cactus thorn removing tool is described in U.S. Pat. No. 5,196,036 to Lamas. This tool comprises a handle having a de-thorning component at its distal end, which may comprise a bent razor blade providing a concave edge, a spoon-like body having a concave edge portion, a sickle-shaped edged body structure having a concave cutting edge or a closed-loop edged body structure with at least one concave edge portion. U.S. Pat. No. 6,401,341 to Hernandez describes a knife set for removing thorns from cactus comprising a cutting tool to de-thorn the cactus pad and a securing tool to hold the pad in place while the cutting tool removes the thorns. The cutting tool has a handle with a curved cutting blade extending outward from the handle, which is in a plane above the longitudinal axis of the curved blade. The cutting blade has sharpened edges that extend the length of the blade that terminate in rounded corners at the blade end to prevent the cutting end from gouging and tearing the edible pad tissue. Although the above patents do address the need to remove thorns from cactus pads, they are not configured to facilitate removal of both the thorns and the non-edible skin of the cactus pad Despite the foregoing tools for removing thorns from cactus, most people still utilize standard knives, tolerating the limitations associated with such knives. What is needed, therefore, is an improved tool for removing thorns from cactus that is also configured to remove the non-edible skin of the cactus pad. The preferred tool should be particularly configured to facilitate the removal of the thorns from the cactus pad in a manner that reduces the likelihood that the user will contact the thorns and injure himself or herself by such contact. Preferably, the tool is also configured to facilitate removal of the non-edible skin portion of the cactus pad in a manner that minimizes the likelihood of injury. The preferred tool should simplify and speed up the process of de-thorning and skinning a cactus pad to prepare the cactus for cooking or other uses.

SUMMARY OF THE INVENTION

The cactus cleaning tool of the present invention solves the problems and provides the benefits identified above. That is to say, the present invention discloses a cactus cleaning tool which is configured for removing both the thorns and the skin from a section of cactus pad. Because both of these functions are incorporated into a single tool, the user can more efficiently and effectively remove the thorns and skin from a cactus pad so as to prepare the cactus for cooking or other uses. The de-thorning component of the cactus cleaning tool is specially configured to allow the user to quickly and easily remove the thorns from a section of cactus, such as the pad of a prickly pear cactus, so the user may then remove the skin from the cactus to access the edible portion of the cactus. The skin removal component of the cactus cleaning tool is configured to allow the user to quickly and easily remove the skin of the cactus so the user can cook or otherwise utilize the edible portion of the cactus. Because both the cactus de-thorning and skinning functions are incorporated into the single cactus cleaning tool of the present invention, the user can more efficiently and effectively prepare the cactus for eating or other uses.

In a primary embodiment of the present invention, the cactus cleaning tool generally comprises a handle and an elongated cleaning section at one end of the handle. In the preferred embodiment, the handle is elongated and tubular shaped and has a first longitudinal axis. The cleaning section has a body member with a proximal end that is attached to or integral with the handle and a distal end which extends outwardly from the handle. The body member has a second longitudinal axis, with the first longitudinal axis of the handle being angled upward relative to the second longitudinal axis of the body member to dispose the handle upward relative to the body member so the user's fingers and hands will not contact the cactus during the cleaning process. The tool has a scooping tip at the distal end of the body member that has an outwardly disposed scooping edge which is configured to scoop out thorns from the section of cactus being cleaned. Preferably, the scooping edge has a generally curved profile, typically being semi-circular or oval, that curves upwardly and rearwardly toward the proximal end of the body member. The tool also has a slicing section in the body member. The slicing section has a slot longitudinally disposed on a lower side of the body member generally between its proximal end and distal end. The slot defines a pair of longitudinal, parallel, spaced apart opposing cutting edges that are configured to slice the skin off of the section of cactus being cleaned. In the preferred embodiment, the tool also has a tapper that is attached to or integral with the body member. The tapper has a tapper body which outwardly disposes a tapping surface that is configured to be tapped against another surface, which could be a table or chair, so as to dislodge any cactus debris that may be stuck in the cleaning tool. Preferably, the tapper is generally disposed between the scooping tip and the slicing section and the tapper body is substantially tubular. The cactus cleaning tool is preferably made out of 304 grade stainless steel, or other stiff and food grade material, and configured with cutting edges that are approximately six inches in length.

Accordingly, the primary aspect of the present invention is to provide a cactus cleaning tool that has the advantages discussed above and overcomes the disadvantages and limitations associated with presently available tools for removing thorns and skin from cactus.

It is an important aspect of the present invention to provide a cactus cleaning tool that is configured to allow the user to easily and quickly remove both the thorns and the skin from cactus, such as a pad of a prickly pear cactus.

It is also an important aspect of the present invention to provide a cactus cleaning tool that has a component which is specially configured to quickly and effectively de-thorn a section of cactus and that is configured to reduce the likelihood the user will harm himself or herself due to contact with the cactus thorns.

It is also an important aspect of the present invention to provide a cactus cleaning tool that has a component which is specially configured to quickly and effectively remove the skin of the cactus to make available the edible portion of the cactus.

Another important aspect of the present invention is to provide a cactus cleaning tool that has a scooping tip at its distal end that is configured to allow the user to quickly and easily remove the thorns from a section of cactus, a skin peeling section having one or more longitudinally disposed cutting edges for peeling the skin off of the cactus and a handle disposed at an upward angle relative to the skin peeling section.

The above and other aspects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein show certain materials and configurations for the handle and the cleaning section of the cactus cleaning tool, those skilled in the art will readily understand that this is merely for purposes of simplifying the present disclosure and that the present invention is not so limited.

Figure 7:
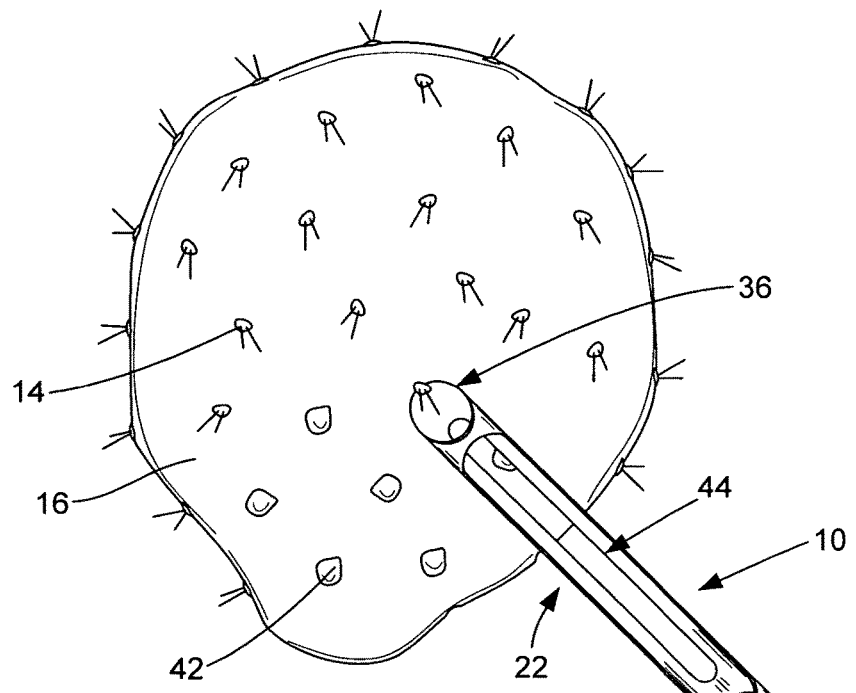
FIG. 7 is a perspective view of the cactus cleaning tool of FIG. 1 in use to scoop out a thorn from a pad section of cactus.
Figure 8:
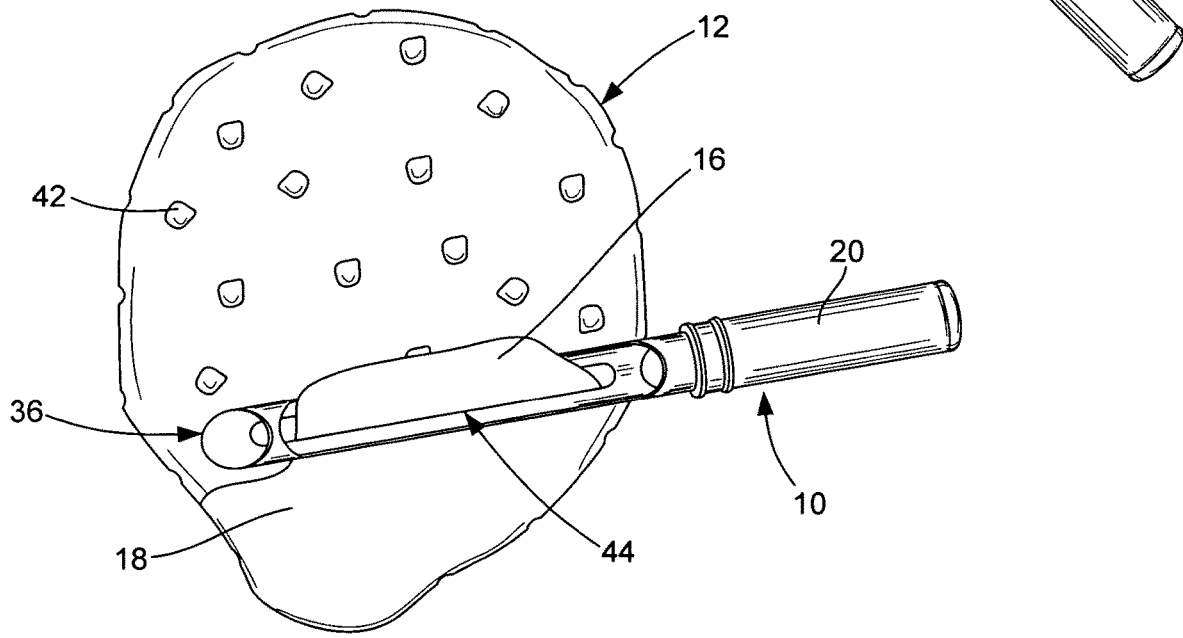
FIG. 8 is a top view of the cactus cleaning tool of FIG. 1 in use to peel the skin from a pad section of cactus.

A cactus cleaning tool that is configured pursuant to a preferred embodiment of the present invention is identified generally as 10 in the figures. As best shown in FIGS. 7 and 8, the cactus cleaning tool 10 is configured for cleaning a section of cactus 12, such as a pad of a prickly pear or mission cactus, to remove the thorns 14 and peel the skin 16 so the user may quickly and easily get to the fleshy edible portion, shown as 18, of the section of cactus 12 for cooking or other uses. The tool 10 generally comprises a handle 20 and a cleaning section 22, as best shown in FIGS. 1 through 4. The cleaning section 22 has a body member 24 with a proximal end 26 that is attached to or integral with the handle 20 and a distal end 28 that extends outwardly from the handle 20. In the preferred embodiment, the body member 24 is made from tubular shaped material that can be formed into tool 10, including forming various cutting and other edges thereon, as set forth below. As will be readily apparent to those skilled in the art, the material for handle 20 and body member 24 must be chosen so as to be sufficiently stiff and hard. Preferably, the material chosen for body member 24 is a standard food grade material, such as 304 grade stainless steel, so that tool 10 may be used and then cleaned before reuse. Numerous other materials may be utilized for body member 24. In the preferred embodiment, handle 20 is a generally elongated tubular shaped component that is made from or covered with a rubber, plastic or like material which provides a comfortable gripping surface 30. As well known in the art, gripping surface 30 can comprise a plurality of slight protrusions and recesses across the handle 20 that allows the user to more comfortably and securely grip handle 20.

Figure 3:
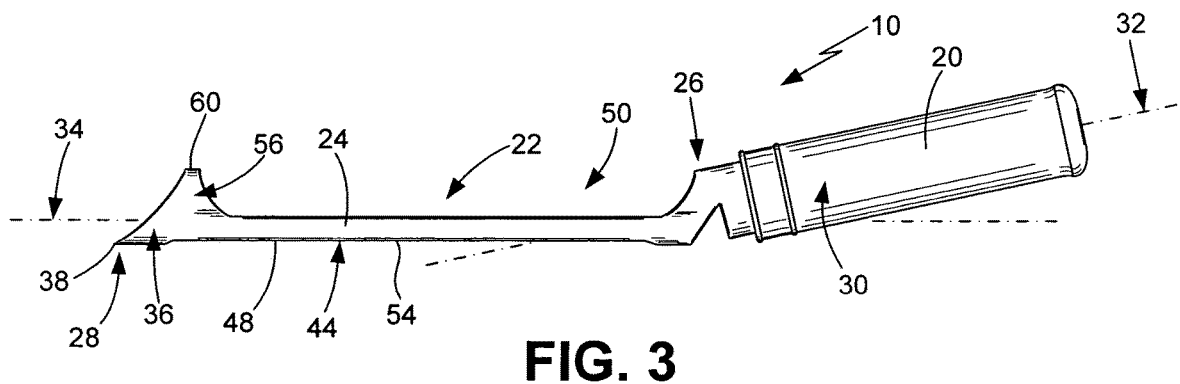
FIG. 3 is a side view of the cactus cleaning tool of FIG. 1 particularly showing the angled relationship between the handle and the cleaning section of the tool.
Figure 6:
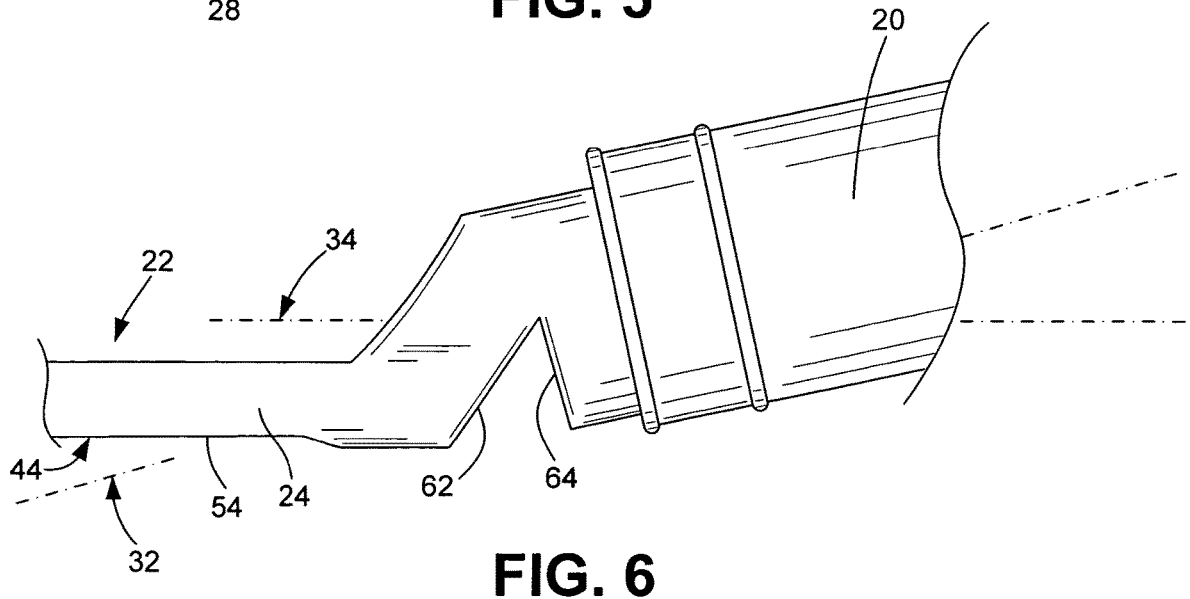
FIG. 6 is an isolated side view of the cactus cleaning tool of FIG. 1 showing the angled relationship between the proximal end of the cleaning section and the handle.

As best shown in FIGS. 3 and 6, handle 20 has a first longitudinal axis 32 and body member 24 has a second longitudinal axis 34. In one possible embodiment of tool 10, the first longitudinal axis 32 can be generally aligned with the second longitudinal axis 34 such that handle 20 is generally aligned with body member 24. In the preferred embodiment of tool 10, however, first longitudinal axis 32 is angled upward relative to second longitudinal axis 34 so as to dispose the handle 20 upwardly relative to the body member 24. The purpose of having handle 20 angled upward relative to the body member 24 is to dispose the user's knuckles away from the section of cactus 12 and the thorns 14 thereon as he or she grips handle 20 to move the cleaning section 22 into position to remove the thorns 14 and skin 16 from the section of cactus 12, as set forth in more detail below. In a preferred embodiment, the first longitudinal axis 32 is at an upward angle of approximately 12° relative to the second longitudinal axis 34 through body member 24, with an angle range of approximately 8° to 20° generally being sufficient to dispose the knuckles away from the section of cactus 12 while still being comfortable for the user to manipulate tool 10 as needed to remove the thorns 14 and skin 16.

Figure 1:
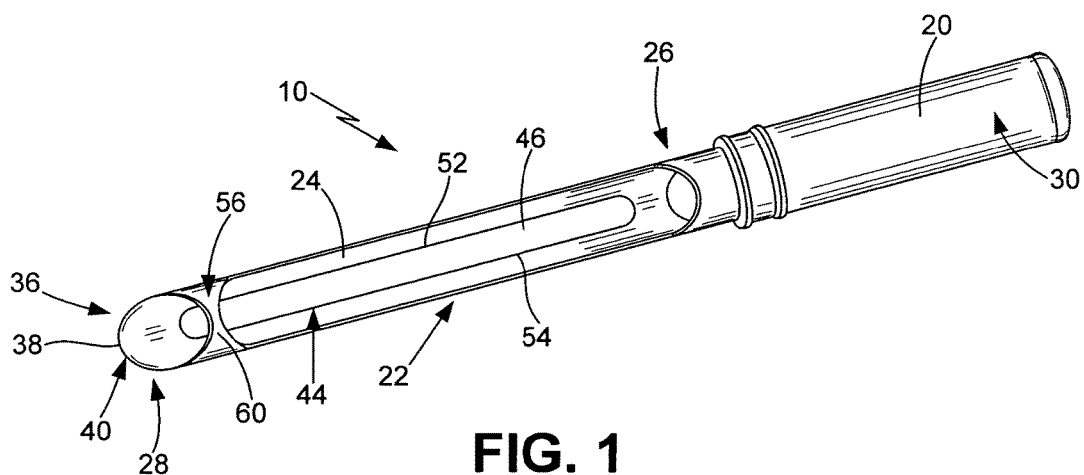
FIG. 1 is a top perspective view of a cactus cleaning tool that is configured according to a preferred embodiment of the present invention.
Figure 2:
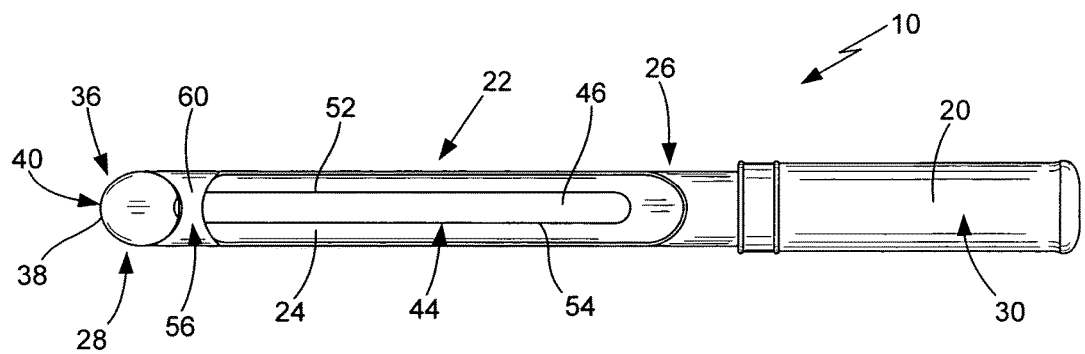
FIG. 2 is a top view of the cactus cleaning tool of FIG. 1.
Figure 4:
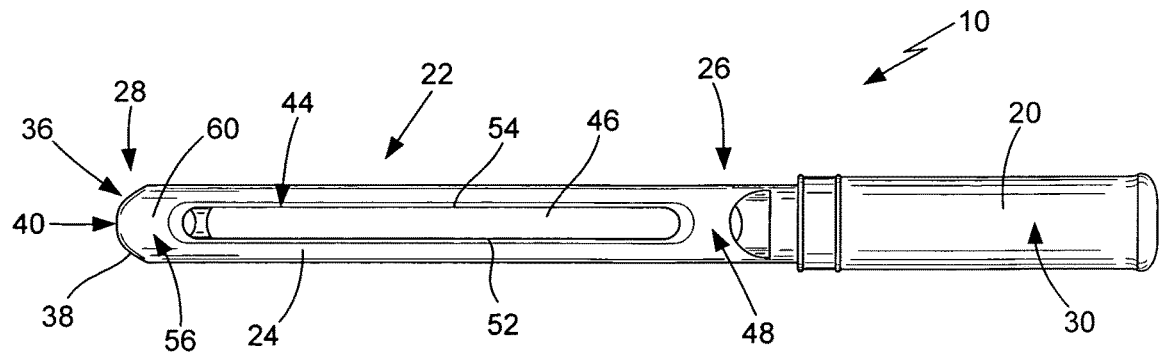
FIG. 4 is a bottom view of the cactus cleaning tool of FIG. 1 showing the cutting edges of the peeling section.
Figure 5:
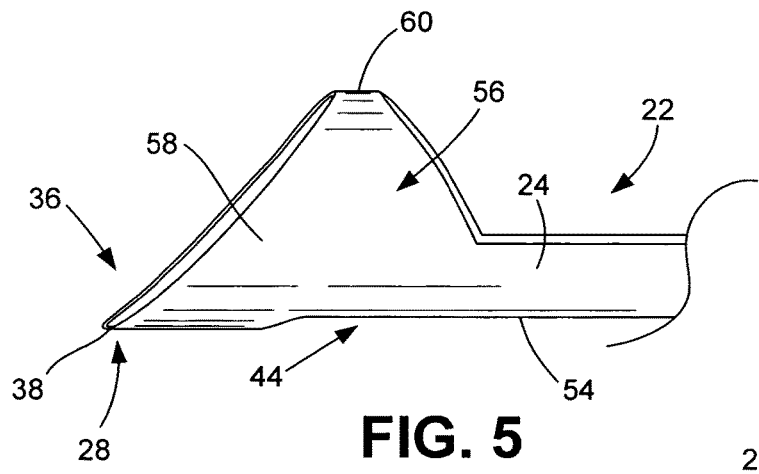
FIG. 5 is an isolated side view of the scooping tip and tapper of the cactus cleaning tool of FIG. 1.

The cleaning section 22 has a scooping tip 36 at the distal end 28 of body member 24. As best shown in FIGS. 1 through 5, the scooping tip 36 of tool 10 comprises a scooping edge 38 that is shaped and configured to facilitate the user directing the scooping edge 38 under one of the thorns 14 on the section of cactus 12, as shown in FIG. 7. In a preferred embodiment, the scooping tip 36 is formed by cutting a 45° angle near the distal end 28 of body member 24, as best shown in FIG. 5. The scooping edge 38 is sharpened to facilitate removal of a thorn 14. In a preferred configuration, the scooping edge 38 has a generally curved profile 40, as best shown in FIGS. 1, 2 and 4, instead of being pointed or triangular shaped, that curves upwardly and rearwardly toward the proximal end 26 of body member 24 to form a bent back U-shaped, scoop-like end. The curved profile 40, which may be generally semi-circular, oval or the like, of scooping edge 36 simplifies the scooping out of a thorn 14 and reduces the likelihood that the user or another person will be injured by the distal end 28 of body member 24. As shown in FIGS. 7 and 8, the scooping edge 38 of scooping tip 36 will leave a small dimple or depression, shown as 42, in the section of cactus 12 where the thorn 14 was previously located. Preferably, the user will direct scooping tip 36 below the thorn 14 so as to only remove little or none of the edible portion 18 of the section of cactus 12.

The cleaning section 22 of tool 10 also has a slicing section 44 configured to facilitate the user slicing the skin 16 of the section of cactus 12 away from the edible portion 18 thereof, as shown being done in FIG. 8. As best shown in FIGS. 1 through 4, slicing section 44 comprises a slot 46 on the lower side 48 of body member 24, that side being the side which is placed against the section of cactus 12 when the skin 16 is to be removed therefrom. As shown, the slot 46 is generally disposed between the proximal end 26 and the distal end 28 (but before the scooping tip 36) of body member 24. Preferably, the slot 46 is longitudinally disposed along the lower side 48 of body member 24. The top side 50 of body member 24 is open, as best shown in FIG. 3 so the user can easily see where the slot 46 is positioned on the section of cactus 12 as tool 10 is being used to remove the skin 16. As set forth in more detail below, in a preferred embodiment, body member 24 is made from a tube and the top part of the tube is removed to form the open top side 50 of body member 24. To facilitate removal of skin 16 from the section of cactus 12, the slot 46 defines one or more cutting edges along the edge of the slot 46. In the preferred embodiments shown in the figures, the slot 46 defines a pair of cutting edges, shown as 52 and 54 that are sharpened to a slicing edge to remove the skin 16 and disposed in spaced apart relation to each other, as shown in FIGS. 1, 2 and 4 (with the edges 52/54 facing each other such that they are in opposing relation). In a preferred configuration, cutting edges 52/54 are longitudinally disposed along the entire length of slot 46 and parallel to each other. As will be apparent to those skilled in the art, the pair of cutting edges 52/54 in slot 46 are generally configured somewhat similar to a standard potato peeler. The user can move the slicing section 44 back and forth across the surface of the section of cactus 12 to peel or scrape off the skin 16 as desired.

In the preferred embodiment of tool 10, the cleaning section 22 also comprises a tapper 56 that is, preferably, disposed generally toward the distal end 28 of body member 24, as best shown in FIGS. 1 through 5. The tapper 56 has a tapper body 58 which is generally outwardly disposed relative to the body member 24 above scooping edge 38 and the cutting edges 52/54. The outward area of the tapper body 58 defines a tapping surface 60 that is configured to be tapped against another surface, such as a table, chair or the like, to dislodge any pieces of the section of cactus 12, including thorns 14, skin 16 or edible portion 18 (shown as skin 16 in FIG. 8, but generally referred to as cactus debris), that gets stuck on the scooping edge 38 or between the cutting edges 52/54. In order to effectively and efficiently utilize tapper 56, the body member 24 must be made out of material which is sufficiently strong and stiff so the user can hit or tap it with enough force to cause any pieces of the section of cactus 12 to separate from tool 10 without breaking tool 10. The use of tapper 56 is believed to be an important feature of tool 10 in that the user can quickly and easily cause any stuck portions of the section of cactus 12 to separate from tool 10 without having to stick his or her fingers anywhere near the cutting edges 52/54, which could result in cuts or other injuries to the user's fingers and/or hand.

In a preferred embodiment, the tool 10 is manufactured from a one inch diameter 304 grade seamless stainless steel tubing approximately thirteen inches in length. A 45° cut is made at one end of the tubing to form the distal end 28 of body member 24, the scooping edge 38 and the forward portion of the tapper 56. A second 45° cut is made into the tubing at approximately one-quarter of an inch toward the opposite end of the tubing to form the tapper 56 and tapping surface 60. The cut forming the tapper 56 is a right hand cut approximately one-half inch deep. Another 45° cut one-half an inch deep, but this one being a left hand cut, is made into the tubing approximately six and one-half inches from the right hand cut. The tubing between the two cuts is removed to form the open top side 50. The elongated slot 46 is then cut into the tubing, which is at the lower side 48 of the body member 24. In one embodiment, the slot 46 is six inches long and the edges of the slot 46, which will define the cutting edges 52/54, are three-eighths of an inch apart. The cutting edges 52/54 are formed along the parallel, longitudinal edges of the slot 46 by grinding in a straight line with a hand held grinder until the edges are very thin. A flat file is worked through the slot 46 to file and sharpen the edges evenly to form cutting edges 52/54. In a preferred configuration, the handle is four and one-half inches long and bent by placing two 45° bending cuts, shown as 62 and 64 in FIG. 6, into the bottom of the tubing that meet each other. The metal between the bending cuts 62/64 is removed and then the handle 20 is raised approximately between 8° and 20°, preferably 12°, to elevate the handle 20 above the cutting surface at cutting edges 52/54. The tool 10 is then checked to remove any sharpened edges, except for scooping edge 38 and cutting edges 52/54, and any burrs or other imperfections.

In use, the user will typically cut, break or otherwise separate a section of cactus 12 from which he or she desires to obtain some edible portion 18 for use in cooking or for other uses. Usually, the first step in cleaning the section of cactus 12 with cleaning tool 12 is to remove the thorns 14 from at least the uneven areas of the section of cactus 12. The user downwardly directs the scooping tip 36 of the cleaning section 22 to alongside one of the thorns 14 until the scooping edge 38 is substantially adjacent the thorn 14. The user then pushes the scooping edge 38 into the section of cactus 12 generally under the thorn 14 to be removed. Continued pushing will scoop out the thorn 14, leaving a generally circular dimple or depression 42 in place of the thorn 14. Preferably, the user is careful not to remove too much of the edible portion 18 of the section of cactus 12. After the thorns 14 are removed, the user then moves the slicing section 44 of the body member 24 in a horizontal, back and forth motion over the section of cactus 12 to peel the skin 16 away from the edible portion 18 of the section of cactus 12. The upward angle of handle 20 relative to body member 24 will allow the user to manipulate the handle 20 without his or her fingers or hand contacting the section of cactus 12. During the process of removing the skin 16 from the section of cactus 12, the user may need to remove pieces of the cactus (e.g., the cactus debris) from the tool 10 so the debris will not interfere with the operation of the slicing section 44. To safely and quickly do this, the user merely has to tap the tapping surface 60 of tapper 56 against a hard surface. Preferably, the user will apply a sharp, hard tap to dislodge any stuck cactus debris from tool 10, without using his or her fingers, so that he or she can continue to clean the section of cactus 12.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to various modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A cactus cleaning tool for cleaning a section of cactus having a plurality of thorns and a skin covering an edible portion of the section of cactus, said cactus cleaning tool comprising:
    a handle having a first longitudinal axis;
    a cleaning section having an elongated body member with a proximal end attached to or integral with said handle and a distal end extending outwardly from said handle, said body member having a second longitudinal axis, said proximal end of said body member having two bending cuts extending inwardly into said body to form said handle at an acute angle relative to said body member so said first longitudinal axis is angled upward relative to said second longitudinal axis to dispose said handle upwardly relative to said body member so as to avoid a user's knuckles contacting one or more of the plurality of thorns when a user is cleaning the section of cactus;
    a scooping tip at said distal end of said body member, said scooping tip having an outwardly disposed sharpened scooping edge with a curved profile that curves upwardly and rearwardly toward said proximal end of said body member so as to facilitate scooping out one of the plurality of thorns with said scooping tip; and
    a slicing section in said body member, said slicing section having a slot disposed on a lower side of said body member generally between said proximal end and said distal end thereof, said slot defining one or more cutting edges configured to slice the skin off of the section of cactus.

2. The cactus cleaning tool of claim 1, wherein said body member has a substantially open top side between said proximal end and said distal end thereof, said open top side sized and configured to allow the user to visualize placement of said slot against said section of cactus when removing the skin from the section of cactus.

3. The cactus cleaning tool of claim 1, wherein said slot is longitudinally disposed in said body member and defines a pair of longitudinally disposed parallel cutting edges.

4. The cactus cleaning tool of claim 1 further comprising a tubular shaped tapper attached to or integral with said body member generally near said distal end thereof so as to be adjacent said scooping tip, said tapper having a tapper body outwardly disposing a tapping surface, said tapper structured and arranged to be tapped so as to dislodge cactus debris from said cleaning tool.

5. The cactus cleaning tool of claim 4, wherein said tapper body is made from a strong and stiff material so as to be forcefully tapped.

6. The cactus cleaning tool of claim 5, wherein said body member is tubular with said top side removed so as to define said tubular shaped tapper and a tubular proximal end of said body member.

7. The cactus cleaning tool of claim 1, wherein said first longitudinal axis of said handle is angled upward approximately 12° relative to said second longitudinal axis of said body member.

8. A cactus cleaning tool for cleaning a section of cactus having a plurality of thorns and a skin covering an edible portion of the section of cactus, said cactus cleaning tool comprising:
   a handle having a first longitudinal axis;
   a cleaning section having an elongated body member with a proximal end attached to or integral with said handle and a distal end extending outwardly from said handle, said body member having a second longitudinal axis, said proximal end of said body member having two bending cuts extending inwardly into said body to form said handle at an acute angle relative to said body member so said first longitudinal axis is angled upward relative to said second longitudinal axis to dispose said handle upwardly relative to said body member so as to avoid a user's knuckles contacting one or more of the plurality of thorns when a user is cleaning the section of cactus;
   a scooping tip at said distal end of said body member, said scooping tip having an outwardly disposed sharpened scooping edge configured to scoop out one of the plurality of thorns with said scooping tip; and
   a slicing section in said body member, said slicing section having a slot longitudinally disposed on a lower side of said body member generally between said proximal end and said distal end thereof, said slot defining a pair of parallel spaced apart opposing cutting edges configured to slice the skin off of the section of cactus.

9. The cactus cleaning tool of claim 8, wherein said first longitudinal axis of said handle is angled upward approximately 12° relative to said second longitudinal axis of said body member.

10. The cactus cleaning tool of claim 8, wherein said scooping edge has a curved profile that curves upwardly and rearwardly toward said proximal end of said body member.

11. The cactus cleaning tool of claim 1 further comprising a tubular shaped tapper attached to or integral with said body member generally near said distal end thereof so as to be adjacent said scooping tip, said tapper having a tapper body outwardly disposing a tapping surface, said tapper structured and arranged to be tapped so as to dislodge cactus debris from said cleaning tool.

12. The cactus cleaning tool of claim 11, wherein said body member is tubular with said top side removed so as to define said tubular tapper and a tubular proximal end of said body member.

13. The cactus cleaning tool of claim 12, wherein said tapper body is made from a strong and stiff material so as to be forcefully tapped.

14. A cactus cleaning tool for cleaning a section of cactus having a plurality of thorns and a skin covering an edible portion of the section of cactus, said cactus cleaning tool comprising:
   a handle having a first longitudinal axis;
   an elongated cleaning section having a body member with a proximal end attached to or integral with said handle and a distal end extending outwardly from said handle, said body member having a second longitudinal axis, said proximal end of said body member having two bending cuts extending inwardly into said body to form said handle at an acute angle relative to said body member so said first longitudinal axis is angled upward relative to said second longitudinal axis so as to dispose said handle upwardly relative to said body member so as to avoid a user's knuckles contacting one or more of the plurality of thorns when a user is cleaning the section of cactus;
   a scooping tip at said distal end of said body member, said scooping tip having an outwardly sharpened disposed scooping edge with a curved profile that curves upwardly and rearwardly toward said proximal end of said body member so as to facilitate scooping out one of the plurality of thorns with said scooping tip;
   a slicing section in said body member, said slicing section having a slot longitudinally disposed on a lower side of said body member generally between said proximal end and said distal end thereof, said slot defining a pair of parallel spaced apart opposing cutting edges configured to slice the skin off of the section of cactus; and
   a tubular shaped tapper attached to or integral with said body member generally near said distal end thereof so as to be adjacent said scooping tip, said tapper having a tapper body outwardly disposing a tapping surface, said tapper structured and arranged to be tapped so as to dislodge cactus debris from said cleaning tool.

15. The cactus cleaning tool of claim 14, wherein said body member is tubular with said top side removed so as to define said tubular shaped tapper and a tubular proximal end of said body member.

16. The cactus cleaning tool of claim 14, wherein said tapper body is made from a strong and stiff material so as to be forcefully tapped.

\* \* \* \* \*